US008566882B2

(12) United States Patent
Pal (10) Patent No.: US 8,566,882 B2
(45) Date of Patent: Oct. 22, 2013

(54) SYSTEMS, METHODS AND APPARATUS FOR EXCHANGING DATA BETWEEN TELEVISION RECEIVERS OVER A WIRELESS COMMUNICATION LINK

(75) Inventor: Rajiv Singh Cullen Pal, Denver, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 1200 days.

(21) Appl. No.: 12/130,768

(22) Filed: May 30, 2008

(65) Prior Publication Data

US 2009/0296000 A1 Dec. 3, 2009

(51) Int. Cl.
*H04N 7/20* (2006.01)
*H04N 7/173* (2011.01)
*H04N 7/16* (2011.01)

(52) U.S. Cl.
USPC .............. 725/71; 725/63; 725/65; 725/68; 725/118; 725/149

(58) Field of Classification Search
USPC .................................... 725/74–104
See application file for complete search history.

(56) References Cited

U.S. PATENT DOCUMENTS

| 6,891,822 | B1 | 5/2005 | Gubbi et al. |
| 7,197,760 | B1 * | 3/2007 | Graef ............................ 725/68 |
| 7,539,481 | B2 * | 5/2009 | Abhishek et al. ............ 455/410 |
| 7,768,977 | B2 | 8/2010 | Camp, Jr. |
| 2002/0138828 | A1 * | 9/2002 | Robohm et al. ................ 725/1 |
| 2004/0093370 | A1 * | 5/2004 | Blair et al. .................... 709/200 |
| 2005/0183134 | A1 * | 8/2005 | Lieberman et al. .......... 725/131 |
| 2006/0031515 | A1 * | 2/2006 | Van Gassel et al. .......... 709/227 |
| 2006/0048227 | A1 * | 3/2006 | Ohta et al. ...................... 726/22 |
| 2006/0190627 | A1 | 8/2006 | Wu et al. |
| 2006/0248553 | A1 * | 11/2006 | Mikkelson et al. ............. 725/23 |
| 2007/0061858 | A1 * | 3/2007 | Ura .............................. 725/112 |
| 2007/0124789 | A1 * | 5/2007 | Sachson et al. ............... 725/117 |
| 2007/0157220 | A1 * | 7/2007 | Cordray et al. ................... 725/9 |
| 2008/0219201 | A1 * | 9/2008 | Challapali et al. ............ 370/312 |
| 2008/0295128 | A1 * | 11/2008 | Aaltonen ........................ 725/32 |
| 2009/0044245 | A1 * | 2/2009 | Yamamoto et al. ........... 725/134 |
| 2009/0133047 | A1 * | 5/2009 | Lee et al. ........................ 725/10 |
| 2010/0153730 | A1 * | 6/2010 | Goria ............................ 713/173 |

(Continued)

FOREIGN PATENT DOCUMENTS

CN 1528090 A 9/2004
CN 1759614 4/2006

(Continued)

OTHER PUBLICATIONS

International Search Report for PCT application PCT/US2009/044300, mailed on Sep. 28, 2009.

(Continued)

*Primary Examiner* — Mushfikh Alam
(74) *Attorney, Agent, or Firm* — Ingrassia Fisher & Lorenz, P.C.

(57) ABSTRACT

Systems, method and apparatus are described for facilitating the collection of data from television receivers. First and second television receivers exchange data over a wireless communication link. The first television receiver transmits the data received from the second television receiver to a data collection system associated with a television provider. The data collection system processes the received data to analyze the operation of the second television receiver.

16 Claims, 6 Drawing Sheets

(56) References Cited

U.S. PATENT DOCUMENTS

| | | | |
|---|---|---|---|
| 2011/0009062 A1* | 1/2011 | Anschutz et al. | 455/41.2 |
| 2011/0034121 A1* | 2/2011 | Ng et al. | 455/3.06 |
| 2012/0036535 A1* | 2/2012 | Cruz et al. | 725/42 |
| 2012/0291074 A1* | 11/2012 | Poltorak | 725/68 |

FOREIGN PATENT DOCUMENTS

| | | |
|---|---|---|
| JP | 2000228764 | 8/2000 |
| JP | 2001298722 | 1/2001 |
| JP | 2002320246 | 10/2002 |
| JP | 2003296464 | 10/2003 |
| JP | 2004023411 | 1/2004 |
| JP | 2006080600 | 3/2006 |
| WO | WO 00/11865 A | 3/2000 |
| WO | WO 02/076100 A | 9/2002 |
| WO | WO 2004/082291 A | 9/2004 |
| WO | WO 2006/114123 A | 11/2006 |
| WO | 2007031962 A2 | 3/2007 |
| WO | WO 2007/078847 A | 7/2007 |

OTHER PUBLICATIONS

Canadian Intellectual Property Office "First Official Action" mailed Jul. 27, 2012 for Canadian Patent Appln. No. 2,725,099.

China Patent Office "Office Action" mailed Jul. 26, 2012 for Chinese Patent Appln. No. 200980120151.8.

Japan Patent Office "Notice of Rejection Ground" mailed Jan. 15, 2013 for Japanese Patent Appln. No. 2011-511704.

Intellectual Property Office of Singapore, Search and Examination Report in Singapore Patent Application No. 201008587-6, mailed Mar. 18, 2013.

\* cited by examiner

SYSTEMS, METHODS AND APPARATUS FOR EXCHANGING DATA BETWEEN TELEVISION RECEIVERS OVER A WIRELESS COMMUNICATION LINK

BACKGROUND

In pay television distribution systems, such as direct satellite broadcast systems, television receivers (also known as set-top boxes) often need to exchange data with a central data collection system. For example, a central data collection system often collects pay-per-view ordering information, health and diagnostics information and the like. Typically, a television receiver includes a modem that may communicate with a call processing system through an analog phone line in a home. The television receiver dials the call processing system periodically and exchanges data over the analog phone line. However, an increasing number of users no longer have wired phone lines at home, and thus it is a problem that television receivers are unable to communicate with the call processing system. Thus, the television provider is unable to collect information regarding the television receiver.

Additionally, the collection of data through telephone calls from television receivers serves to identify piracy and fraud in the television distribution system. Account packing is one type of piracy/fraud that may be identified by a call processing system. Account packing involves a subscriber leasing multiple legitimate television receivers for use in a single location and instead using the receivers in disparate locations. For example, a satellite television subscriber may utilize one television receiver at their home, and may allow a friend to use another television receiver at the friend's home. In effect, the subscriber and the friend get two accounts while only paying for a single account. By collecting data through telephone calls from the television receivers, the satellite television provider may identify television receivers which are utilized in unauthorized locations. However, the decline of home telephone lines has made the identification of account packing and other types of fraud more difficult for television providers.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the collection of data from television receivers. More particularly, the various embodiments described herein facilitate the transmission of data between television receivers over a wireless communication link. A first television receiver exchanges data with a second television receiver over the wireless communication link. The first television receiver subsequently transmits the data to a data collection system of a television provider. The data collection system processes the received data to analyze the operation of the first and/or second television receivers. In short, the various embodiments described herein provide systems, methods and apparatus for exchanging data between television receivers over a wireless communication link and transmitting the data from at least one of the television receivers to a data collection system.

In at least one embodiment, multiple television receivers communicate to form a wireless network. Each television receiver comprises a node within the wireless communication network. Data is communicated to multiple nodes and may be transmitted to the data collection system by any of the television receivers which are communicatively coupled to the data collection system. For example, a wireless network may be comprised of three television receivers. In the described embodiment, the third television receiver is communicatively coupled to the data collection system through a communication network, whereas the first and second television receivers are not connected to the communication network. The first and second television receivers are within wireless range of each other. Likewise, the second and third television receivers are within wireless range of each other. However, the first and third television receivers are located out of wireless range of each other. The first television receiver exchanges data with a second television receiver. Subsequently, the second television receiver exchanges the data with the third television receiver. The third television receiver maintains a database of neighboring television receivers and transmits portions of the database to the data collection system. The data collection system processes the data to analyze the operation of the television receivers.

Thus, the first, second and third television receivers form a local communication network for transmitting data from any television receiver to the data collection system. In accordance with the described embodiment, a data collection system may receive data from television receivers which are not connected to a telephone network, the internet or other types of communication networks. Thus, the data collection system may analyze the operating conditions of a television receiver based on data that was previously inaccessible to the data collection system. Further, information regarding the nodes of the local communication network may be utilized to approximate the location of a television receiver. The approximated location of a television receiver may be utilized to detect account packing, piracy and other types of frauds perpetuated by users of the television distribution system.

Figure 1:
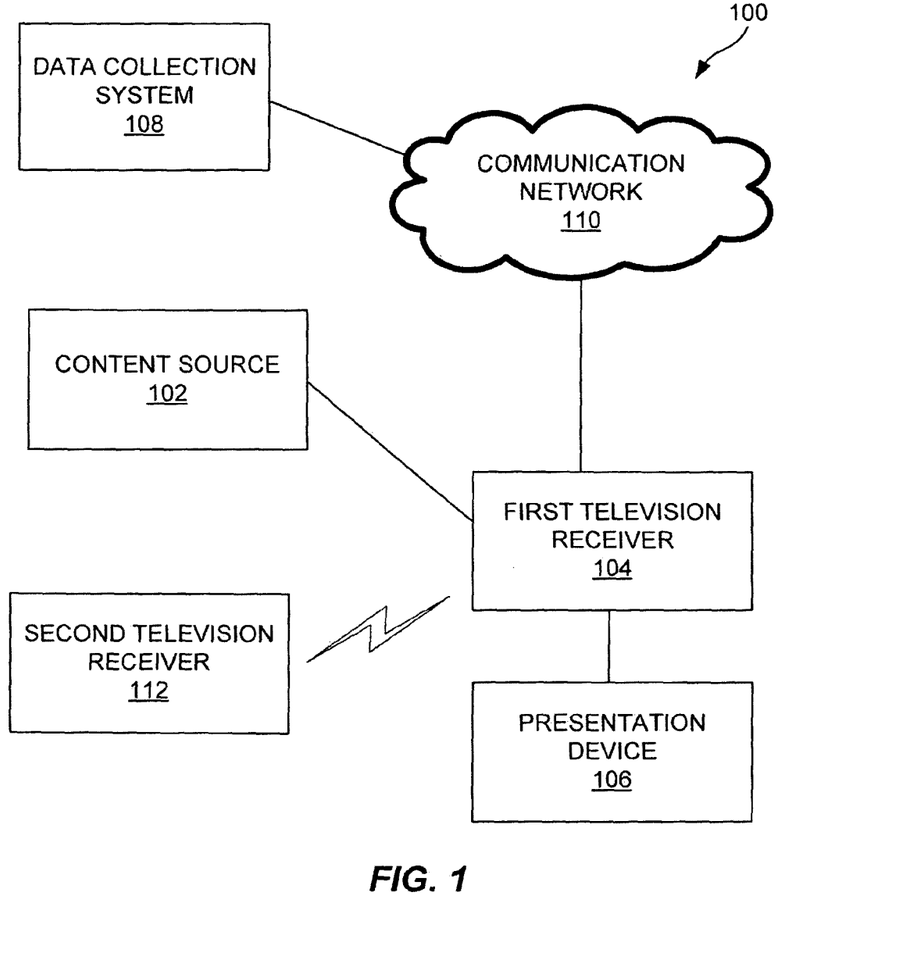
FIG. 1 illustrates an embodiment of a television distribution system.

FIG. 1 illustrates an embodiment of a television distribution system 100. The television distribution system 100 includes a content source 102, a first television receiver 104, a presentation device 106, a data collection system 108, a communication network 110 and a second television receiver 112. Each of these elements will be discussed in greater detail below. Further, the television distribution system 100 may include other elements, components and/or devices not illustrated for the sake of brevity.

The content source 102 is operable for receiving, generating and communicating content to one or more television receivers 104 and 112. The content to be received, processed, outputted and/or communicated may come in any of various forms including, but not limited to, audio, video, data, information, or otherwise. Though FIG. 1 illustrates multiple television receivers 104 and 112, the description regarding the transmission of content from the content source 102 will be focused on the delivery of content to the television receiver 104. However, it is to be appreciated that a similar transmission process may be applied to transfer content from the content source 102 to the television receiver 112.

In at least one embodiment, the content source 102 is operable for receiving various forms and types of content from other sources, aggregating the content and transmitting the content to the television receivers 104 and 112. It is to be appreciated that the content source 102 may receive practically any form and/or type of information from one or more sources including streaming television programming, recorded audio or video, electronic programming guide data and the like. Exemplary content sources 102 include television distribution systems (e.g., over-the-air transmission facilities, cable television distribution head-ends and satellite television uplink centers), broadband or internet servers and the like.

The first television receiver 104 is operable to receive content from the content source 102, and to output the received content for presentation by the presentation device 106. In at least one embodiment, the presentation device 106 is a display device (e.g., a television) configured to display content to a user. The first television receiver 104 may receive an audio/video stream in any format (e.g., analog or digital format), and output the audio/video stream for presentation by the presentation device 106. For example, the television receiver 104 may be a satellite, cable, over-the-air, broadband or other type of television receiver that receives and demodulates television signals that are outputted for display on a display device (e.g., a television). As used herein, a television receiver may also be referred to as a set-top box, which is a television receiver that is located externally with respect to a display device. The first television receiver 104 may be further configured to output menus and other information that allow a user to control the output of video content by the first television receiver 104. In some embodiments, the first television receiver 104 and the presentation device 106 may be integrated as a device combining the functionality of a display device and a set-top box, digital video recorder (DVR) or the like.

The first television receiver 104 is further operable to generate or aggregate data for transmission to the data collection system 108. The data to be received, processed, outputted and/or communicated may come in any of various forms including, but not limited to, audio, video, text, data, information, or otherwise. For example, the first television receiver 104 may aggregate data regarding the output of video content by the first television receiver 104 as well as the general operating conditions of the first television receiver 104. For example, the aggregated data may include various types of data generated by a television receiver, including pay-per-view ordering information, demographic information, health and diagnostic information, quality of service/signal reception information, account information and the like. The health and diagnostics information may be augmented by performance statistics, including whether the television receiver 104 is overheating, the processor speed for the television receiver 104 and/or the space utilized on a hard drive of other storage medium of the television receiver 104. In at least one embodiment, the information includes power statistics, e.g., information regarding when a particular television receiver is powered on/powered off. The information may further include data regarding what time of day (if ever) that a particular television receiver is unplugged/disconnected from a power supply. Such information may indicate a user that is attempting to restrict the transmission of data from a television receiver to the data collection system 108.

The first television receiver 104 is further configured to wirelessly communicate with other television receivers 112 within wireless range of the first television receiver 104. More particularly, the first television receiver 104 communicates with the second television receiver 112 to exchange data. In at least one embodiment, the television receivers 104 and 112 exchange the data aggregated by the first television receiver 104. Likewise, the second television receiver 112 may aggregate similar data, which is also exchanged between the television receivers 104 and 112. The exchanged data may include other information which is described in further detail below.

The television receivers 104 and 112 may communicate using any type of wireless communication link utilizing any type of wireless frequency and/or protocol. For example, the television receivers 104 and 112 may communicate over unlicensed radio frequencies or channels, such as citizens band radio (CB-Radio) (e.g., the 27 MHz band) or Family Radio Service (FRS). In other embodiments, the television receivers 104 and 112 may communicate using other frequencies and protocols, such as WiFi, Ultra Wide Band (UWB) and the like. It is to be appreciated that the protocol and/or frequency of the wireless communication link frequency may be selected based on desired design criteria.

In at least one embodiment, the second television receiver 112 is similar to the first television receiver 104. The second television receiver 112 receives content from the content source 102 and outputs the received content to an associated presentation device (not shown in FIG. 1). The content received by the second television receiver 112 may be the same as and/or different than the content received by the first television receiver 104. In at least one embodiment, the first television receiver 104 is in a location that is disparate with respect to the second television receiver 112. It is to be appreciated that the distance between the television receivers 104 and 112 may be less than or equal to the wireless range of the television receivers 104 and 112.

The communication network 110 is operable to communicatively couple the first television receiver 104 to the data collection system 108. The communication network 110 may provide any type of connectivity to the first television receiver 104. For example, the communication network 110 may provide telephone connectivity to the first television receiver 104 in at least one embodiment. In another embodiment, the communication network 110 provides internet connectivity to the first television receiver 104.

The communication network 110 may utilize any desired combination of wired (e.g., cable and fiber) and/or wireless (e.g., cellular, satellite, microwave, and other types of radio frequency) communication mediums and any desired network topology (or topologies when multiple mediums are utilized). Exemplary communication networks include wireless communication networks (e.g., cellular telephone or WiMax), public switched telephone networks (PSTN), and local area networks (LAN) or wide area networks (WAN) providing data communication services.

The data collection system 108 may be any type of device, system or combination of devices or systems that receive data from a remotely located television receiver 104 over the communication network 110. The data collection system 108 may be further operable to transmit data to the television receiver 104 over the communication network 110. For example, the data collection system 108 may comprise a call processing system that receives data from the first television receiver 104 through a PSTN. In another embodiment, the data collection system 108 comprises a server that receives data from the first television receiver 104 over the internet or other type of data communication network. The first television receiver 104 establishes a communication link with the data collection system 108 through the communication network 110 and transmits data to the data collection system 108. More particularly, the first television receiver 104 transmits the data aggregated by the second television receiver 112 to the data collection system 108. In at least one embodiment, the data aggregated by the second television receiver 112 is transmitted by the first television receiver 104 to the data collection system 108 in association with the data aggregated by the first television receiver 104.

The data collection system 108 processes the data from the first television receiver 104 to analyze the output of the audio/video content by the television receivers 104 and 112. For example, the data may include pay-per-view ordering information or other usage data, and the data collection system 108 may generate bills for users of the television receivers 104 and 112 based on the received data. In some embodiments, the data includes health and diagnostics information regarding the television receivers 104 and 112, and the data collection system 108 processes the data to identify operating problems of the first television receiver 104 and/or the second television receiver 112. In at least one embodiment, the health and diagnostics information is associated with data regarding the quality of service of the reception of channels/video content outputted by the first television receiver 104. As described in further detail below, the data collection system 108 may analyze the data from the first television receiver 104 to determine locations of the television receivers 104 and 112. The locations of the television receivers 104 and 112 may be utilized to identify piracy, fraud, unauthorized usage, programming that the television receivers 104 and 112 are authorized to output and the like.

Figure 2:
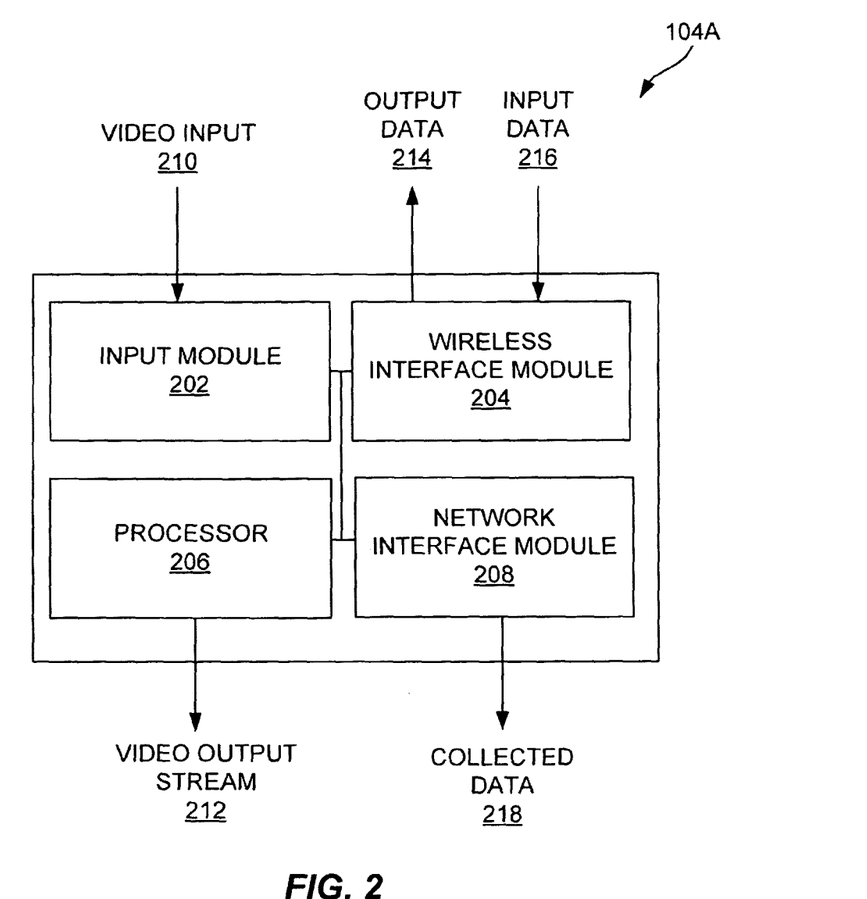
FIG. 2 illustrates an embodiment of a television receiver of FIG. 1.

FIG. 2 illustrates an embodiment of a television receiver of FIG. 1. FIG. 2 will be discussed in reference to the television distribution system 100 illustrated in FIG. 1. The television receiver 104A includes an input module 202, a wireless interface module 204, a processor 206 and a network interface module 208. Each of these components will be discussed in greater detail below. The television receiver 104A may include other elements, such as a storage medium, a remote control interface and the like which are not illustrated for the sake of brevity of the discussion.

The input module 202 is operable to receive the video input 210 from the content source 102 (see FIG. 1). In at least one embodiment, the input module 202 comprises a tuner operable to receive and tune any type of television signal. For example, the input module 202 may receive an over-the-air broadcast, a direct broadcast satellite signal or a cable television signal and tune the video input 210 to extract selected television programming. In at least one embodiment, the input module 202 is communicatively coupled to a satellite antenna (not shown in FIG. 2) to receive satellite television broadcasts from a satellite.

The processor 206 is operable to control the operation of the television receiver 104A. The processor 206 may be a single processing device or a plurality of processing devices that cooperatively operate to control the operation of the television receiver 104A. The processor 206 may include various components or modules for processing and outputting video content. Exemplary components or modules for processing video content include a demodulator, a decoder, a decompressor, a conditional access module and a transcoder module.

The processor 206 processes the video input 210 to generate a video output stream 212. The video output stream 212 is outputted to the presentation device 106 (see FIG. 1) for presentation to a user. The processor 206 may incorporate circuitry to output the audio/video streams in any format recognizable by the presentation device 106, including composite video, component video, Digital Visual Interface (DVI) and High-Definition Multimedia Interface (HDMI). The processor 206 may also incorporate circuitry to support multiple types of these or other audio/video formats. In at least one embodiment, the television receiver 104 may be integrated with the presentation device 106, and the processor 206 may be operable to control the presentation of the video output stream 212. The processor 206 may further aggregate data regarding the output of the content, such as ordering information, demographic information, health and diagnostic information regarding the television receiver 104A and the like.

The wireless interface module 204 is operable to wirelessly communicate with other television receivers 112 (see FIG. 1). The wireless interface module 204 may communicate with a second television receiver 112 over any type of wireless communication link. In some embodiments, a satellite antenna utilized by the television receiver 104A to receive television programming may be additionally utilized by the wireless interface module 204 to receive/transmit data with other television receivers 112. More particularly, the satellite antenna may include an integrated wireless antenna operable to communicate with the wireless communication network 112. Thus, interference caused by walls and other obstacles is minimized by the placement of the antenna utilized by the wireless interface module 204.

In at least one embodiment, the wireless interface module 204 is operable to discover other television receivers 112 within wireless range and initiate a communication with the other television receivers 112. The wireless interface module 204 may discover other television receivers 112 by initially and/or periodically broadcasting a discovery request to other television receivers 112 within wireless range. Similarly, the wireless interface module 204 may be operable to respond to discovery requests from other television receivers 112. The wireless interface module 204 may further operate to store information regarding the other television receivers 112 on a storage medium (not shown) of the television receiver 104A for subsequent utilization.

In at least one embodiment, the wireless interface module 204 operates to exchange data with the second television receiver 112. More particularly, the wireless interface module transmits output data 214 to the second television receiver 112 and receives input data 216 from the second television receiver 112. The output data 214 comprises the data aggregated by the processor 206. The output data 214 may further comprise data aggregated by other television receivers in communication with the television receiver 104A. For example, the output data 214 may comprise data aggregated by a third television receiver (not shown in FIGS. 1-2), which is transmitted to the television receiver 104A.

The input data 216 comprises data aggregated by the second television receiver 112. Similarly, the input data 216 may comprise data aggregated by another television receiver besides the television receivers 104A and 112. For example, the second television receiver 112 may store a database of information regarding other television receivers within wireless range. For example, the other television receivers within wireless range of the television receiver 104A are of a first degree in relation to the television receiver 104A. Further, each database may include the same or similar type of information regarding other television receivers as exchanged between the television receivers 104A and 112. The television receivers within wireless range of the television receiver 104A may be different than the television receivers within wireless range of the television receiver 112. Thus, the databases of the television receivers 104A and 112 may be different. When exchanging data, the television receivers 104A and 112 may exchange portions of the databases regarding other television receivers within wireless range.

Thus, the wireless interface module 204 may receive first degree data regarding the second television receiver 112 and second degree data regarding another television receiver that is not in direct communication with the television receiver 104A. The television receiver 104A may utilize the received information regarding other television receivers to build a database of the neighbors of the television receiver 112. The database may be extended several degrees, allowing the television receiver 104A to store information regarding its neighbors (e.g., the television receiver 112), the neighbors of its neighbors and so forth.

In at least one embodiment, the input data 216 may include third degree data regarding a television receiver that is not in direct communication with either of the first or second television receivers 104A and 112. Thus, in effect, the television receiver 112 transmits a portion of its stored database to the wireless interface module 204. The second television receiver 112 may transmit any number of degrees of data to the wireless interface module 204 depending on desired design criteria. For example, each television receiver 104A and 112 may store three degrees of data in its database, and may be operable to exchange two degrees of its database with other television receivers within wireless range.

The network interface module 208 is operable to transmit collected data 218 to the data collection system 108 through the communication network 110. The network interface module 208 may comprise any type of device for transmitting the collected data 218 to the data collection system 108 (see FIG. 1) over any type of communication network. In at least one embodiment, the collected data 218 includes the input data 216 and the data aggregated by the processor 206. The collected data 218 may include other data, such as data received from additional television receivers. In at least one embodiment, the processor 206 selects a subset of the aggregated data, the input data 216 and other types of data for transmission to the data collection system 108.

In at least one embodiment, the network interface module 208 comprises a modem that transmits data to the data collection system 108 through a telephone network. In other embodiments, the network interface module 208 comprises a broadband connection (e.g., an Ethernet port or the like) for transmitting data to the data collection system 108 over an internet connection. In some embodiments, the network interface module 208 communicates with the data collection system 108 over a wireless telephone network. For example, the network interface module 208 may transmit short message service (SMS) messages and the like through the wireless telephone network.

It is to be appreciated that user disablement or tampering with the wireless interface module 204 may frustrate the flow of data through the television distribution system 200. An unscrupulous user may attempt to disable the wireless interface module 204, restricting the flow of information from the television receiver 104A. For example, a network interface module 208 may be unconnected from the communication network 110, and a user may disable the wireless interface module 204 to prevent the transmission of usage information to the data collection system 108 via other television receivers 112. To prevent tampering with the wireless interface module 204, the processor 206 may be operable to optionally detect that the wireless interface module 204 has been disabled and responsively disable the output of video content.

Those of ordinary skill in the art will appreciate that the various functional elements 202 through 208 shown as operable within the television receiver 104A may be combined into fewer discrete elements or may be broken up into a larger number of discrete functional elements as a matter of design choice. Thus, the particular functional decomposition suggested by FIG. 2 is intended merely as exemplary of one possible functional decomposition of elements within the television receiver 104A.

Figure 3:
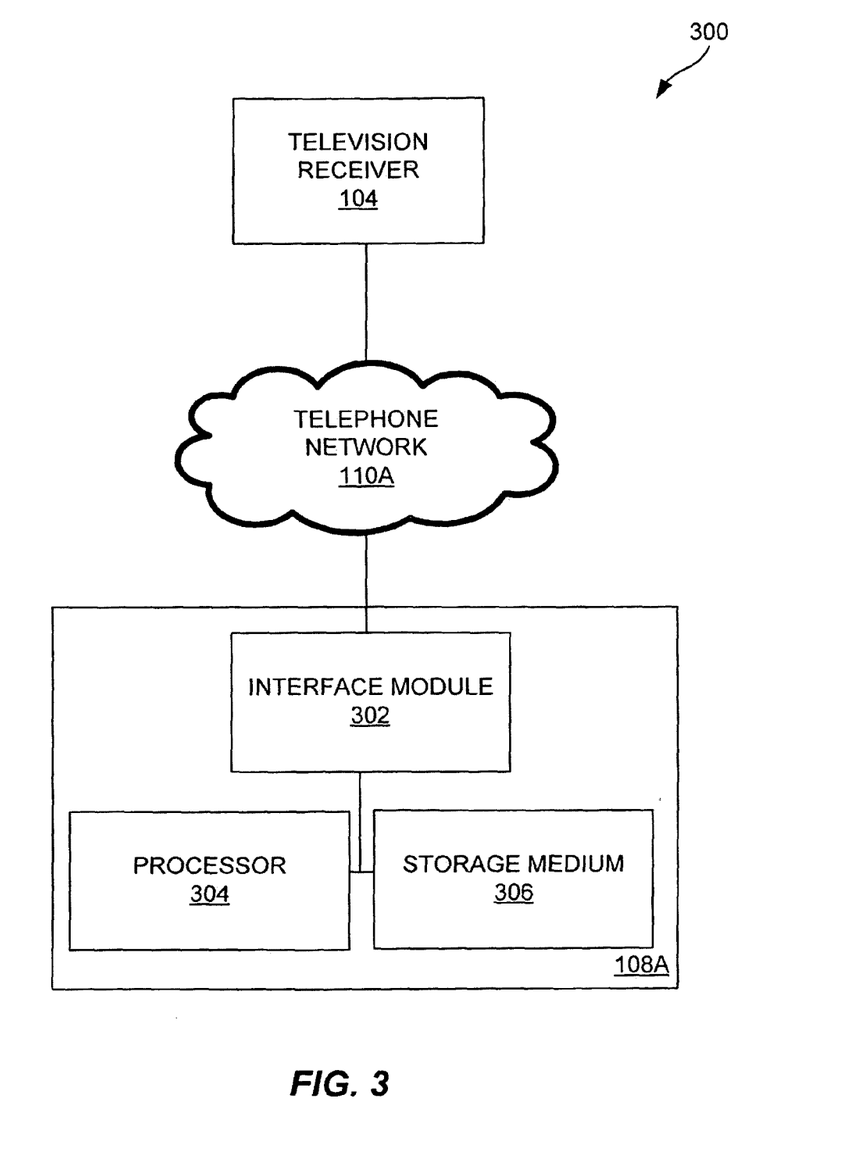
FIG. 3 illustrates an embodiment of a communication system.

In at least one embodiment, the data collection system 108 comprises a call processing system that receives data from a television receiver 104 over a telephone network. FIG. 3 illustrates an embodiment of a communication system 300. More particularly, FIG. 3 illustrates the details of a call processing system 108A that receives data from a television receiver 104 over a telephone network 110A. The communication system 300 includes a television receiver 104, a telephone network 110A and a call processing system 108A. The call processing system 108A includes an interface module 302, a processor 304 and a storage medium 306. Each of these components will be discussed in greater detail below. The discussion of components common to FIGS. 1-2 is omitted herein for the sake of brevity, and the communication system 300 may comprise other elements, components or devices not illustrated for the sake of brevity.

The call processing system 108A may be any type of device, system or combination of devices or systems that receives data from a remotely located television receiver 104 over a telephone network 110A. The television receiver 104 initiates a phone call to the call processing system 108A to exchange data. An interface module 302 of the call processing system 108A is communicatively coupled to the telephone network 110A to receive the phone call.

The interface module 302 may comprise any type of telephone connection (e.g., a modem) for receiving the phone call. In at least one embodiment, the interface module is communicatively coupled to a public switched telephone network (PSTN) (not shown) in communication with the communication network 110. The interface module 302 processes a received signal in the phone call to extract data and convert the data into a digital format.

The storage medium 306 to the call processing system 108A is configured to store any type of data utilized by the call processing system 108A. The storage medium 306 may be any type of storage device, including hard drives, flash memory, tapes, optical storage devices and the like. Further, the storage medium 306 may include any number of storage devices that are physically and/or logically partitioned. In at least one embodiment, the storage medium 306 stores data regarding the television receiver 104. For example, the television receiver 104 may be a satellite television receiver and the data stored on the storage medium may include account information, pay-per-view ordering information, health and diagnostics information and the like.

The processor 304 of the call processing system 108A is operable for controlling the operation of the call processing system 108A. The processor 304 may be a single processing device or a plurality of processing devices that cooperatively operate to control the operation of the call processing system 108A. In at least one embodiment, the processor 304 receives the digital format data from the interface module 302 and associates the digital format data with stored information regarding the television receiver 104. For example, if the data includes video ordering information regarding the television receiver 104, then the processor 304 may update account information regarding a user of the television receiver 104 based on the video ordering information. In other embodiments, the data may include demographic information or health and diagnostic information regarding the television receiver 104 that is stored and utilized by the processor 304.

The processor 304 and/or related systems may be operable to perform further processing of the data received from the television receiver 104. For example, the processor 304 may generate a bill for a user of the television receiver 104 based on the received video ordering information. If the received data includes health and diagnostic information, then the processor 304 may analyze the data to identify potential problems with the television receiver 104.

In at least one embodiment, the received data is utilized to identify locations of the television receivers. For example, the processor 304 may identify the location of the television receiver 104 based on caller ID data or the like. The processor 304 may further identify that the received data includes information regarding a second television receiver 112 (see FIG. 1) that is located one degree from the television receiver 104. If the wireless range of the television receiver 104 is known, then the location of the second television receiver 112 may be approximated by the processor 304.

The processor 304 may perform further processing and analysis regarding the identified location of the second television receiver 112. In at least one embodiment, the processor 304 may identify whether the second television receiver 112 is authorized for utilization in that particular location. For example, the processor 304 may identify account packing issues with the television receiver 112. In other situations, a television provider may authorize a receiver in a first market (e.g., Chicago), but a user may move the television receiver 112 to a second market (e.g., Phoenix) to receive out-of-market programming in Phoenix. Thus, the processor 304 may identify this unauthorized use of the television receiver 112.

After identifying the unauthorized use of the television receiver 112, the processor 304 may generate messages and commands for the television receiver 112 to rectify or eliminate the unauthorized use. For example, the processor 304 may generate messages for transmission to the television receiver 112 that request disablement of the output of video content by the television receiver in at least one embodiment, the message may be delivered in association with the video content. For example, the disablement message may be transmitted by a content source 102 multiplexed with video content and/or other data transmitted to the television receiver 112. In other embodiments, the disablement message may be transmitted from the processor 304 to the television receiver 112 through the communication network 110 and/or other television receivers 104.

In at least one embodiment, the processor 304 utilizes the location information to identify programming that the second television receiver 112 is authorized to output for presentation. For example, the processor 304 may identify the approximate zip code location of the second television receiver 112 and identify programming authorized in that location (e.g., local channels). The processor 304 generates an authorization message which is transmitted to the second television receiver 112. The second television receiver 112 utilizes the authorization message to identify the video content authorized for output by the second television receiver 112. The authorization message may be transmitted similarly to the disablement message described above. If the television receiver 112 is outputting channels that the television receiver 112 is not authorized to present in a particular location, then the processor 304 may generate messages which are transmitted to the television receiver 112 to restrict the output of the unauthorized channels.

Those of ordinary skill in the art will appreciate that the various functional elements 302 through 306 shown as operable within the call processing system 108A may be combined into fewer discrete elements or may be broken up into a larger number of discrete functional elements as a matter of design choice. Thus, the particular functional decomposition suggested by FIG. 3 is intended merely as exemplary of one possible functional decomposition of elements within the call processing system 108A.

Figure 4:
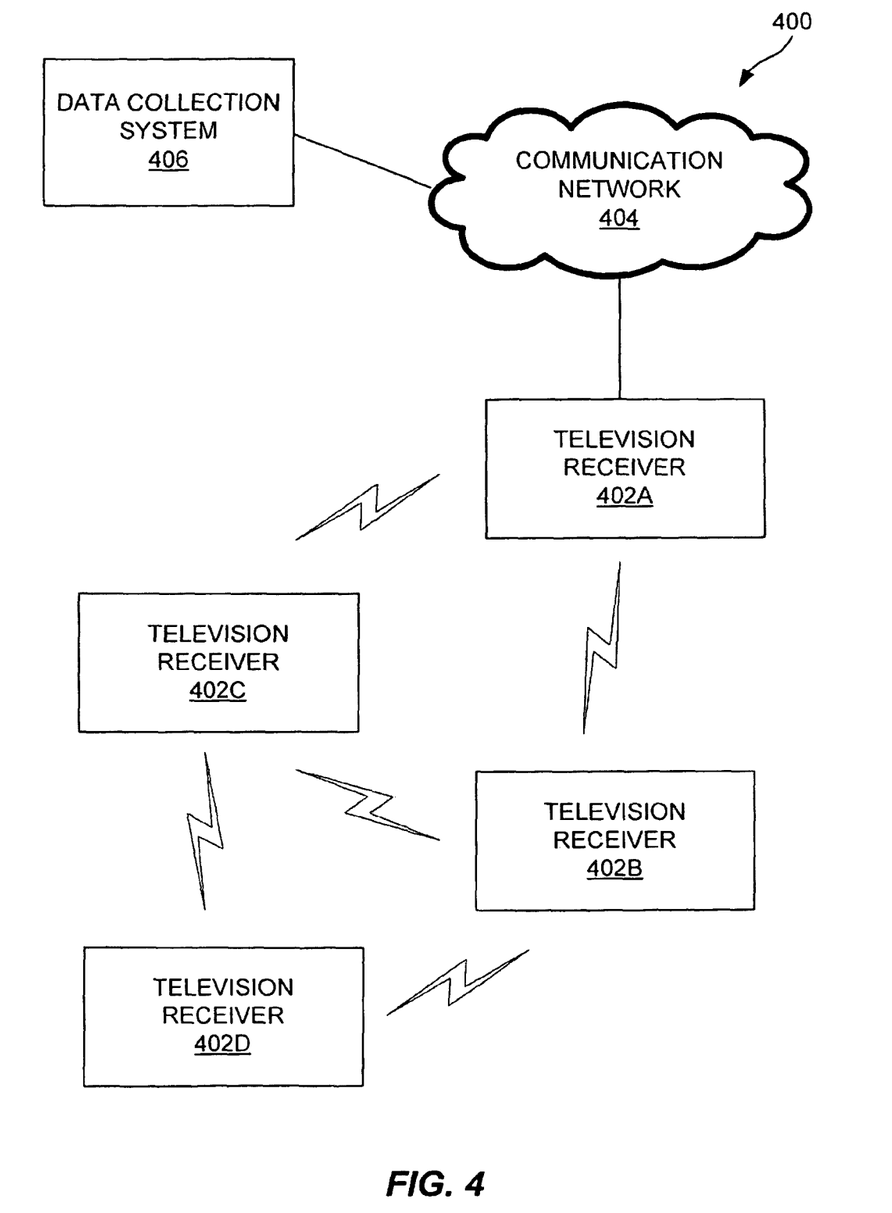
FIG. 4 illustrates an embodiment of a communication network comprised of multiple television receivers.

As described above, a communication network may be comprised of multiple television receivers that wirelessly communicate together. Thus, a single television receiver may collect information regarding the immediate neighbors of the television receiver (e.g., a first degree), as well as additional degrees of television receivers which are not within wireless range. FIG. 4 illustrates an embodiment of a communication network comprised of multiple television receivers. The communication network 400 includes multiple television receivers 402A-402D, a communication network 404 and a data collection system 406. Each of these components will be discussed in greater detail below. The communication network 400 may include other elements, components or devices not illustrated for the sake of brevity.

A television receiver 402A is communicatively coupled with the data collection system 406 through the communication network 404. Thus, the television receiver 402A may directly communicate data with the data collection system 406. By contrast, the television receivers 402B-402D are not communicatively coupled with the data collection system 406, and may not directly transmit data to the data collection system 406.

Each television receiver 402A-402D is operable to exchange data with the other television receivers 402A-402C within wireless range. In the illustrated embodiment, the television receiver 402A is able to wirelessly communicate with television receivers 402B and 402C. The television receivers 402B and 402C are able to wirelessly communicate with each of the other television receivers 402A-402D. Each television receiver 402A-402D aggregates data regarding its output of audio/video content and operating conditions. The data aggregated by the television receiver 402A is designated herein as first data, whereas the data aggregated by each of television receivers 402B-402D is designated as second data, third data and fourth data, respectively.

The television receiver 402A transmits the first data to the television receiver 402B, and the television receiver 402A also receives the second data from the television receiver 402B. Similarly, the television receiver 402A transmits the first data to the television receiver 402C and receives the third data from the television receiver 402C. If the television receiver 402A communicates with the television receiver 402C after communicating with the television receiver 402B, then the television receiver 402A may also transmit the second data to the television receiver 402C in association with the first data. Thus, the television receiver 402C receives two degrees of data from the television receiver 402A.

Similarly, the television receiver 402C may transmit other degrees of data to the television receiver 402A. For example, the television receiver 402C may have received the fourth data from the television receiver 402D, and may transmit the fourth data to the television receiver 402A. Thus, the television receiver 402A receives a first degree of data (regarding the television receiver 402C) and a second degree of data (regarding the television receiver 402D). After communicating with the television receivers 402B and 402C, the television receiver 402A transmits the first data, the second data, the third data and the fourth data to the data collection system 406. As described above, the data collection system 406 utilizes the received data to analyze the output of audio/video content by each of the television receivers 402A-402D.

In at least one embodiment, a television receiver 402A-402D may be operable to discard or ignore received data which is a specified number of degrees away from the television receiver 402A. In other embodiments, a television receiver 402A-402D may not transmit data to other television receivers 402A-402D if the data is of a specified number of degrees away from the television receiver 402A. For example, the television receiver 402D may receive fifth data from a television receiver out of the wireless range of the television receivers 402A-402C, and may transmit the fourth and fifth data to the television receiver 402C. From the perspective of the television receiver 402D, the fifth data is of a first degree. From the perspective of the television receiver 402C, the fifth data is of a second degree, and from the perspective of the television receiver 402A is of a third degree. In at least one embodiment, the television receiver 402C may be operable to transmit the fourth data to the television receiver 402A, but may not transmit the fifth data to the television receiver 402A. In other embodiments, the television receiver 402C may transmit the fifth data to the television receiver 402A, but the television receiver 402A may not transmit the fifth data to the data collection system 406 because the data is too many degrees away from the transmitting device. It is to be appreciated that the number of degrees utilized for ignoring data may be selected based on desired design criteria.

In the illustrated embodiment, a television receiver 402A-402D may receive the same set of data from multiple sources. In at least one embodiment, a television receiver 402A-402D may be operable to discard a set of data which is of a higher degree. For example, the television receiver 402A may receive the second data from the television receiver 402B. The television receiver 402A may also receive the second data from the television receiver 402C. Thus, the television receiver 402A may transmit the directly received second data to the data collection system 406, as it is the most likely accurate data regarding the television receiver 402B.

Similarly, the data collection system 406 may receive the same data or substantially the same data from multiple television receivers 402A-402B. For example, each of the television receivers 402A-402D may generate, receive and/or store the first data, the second data, the third data and the fourth data. Further, a plurality of the television receivers 402A-402B may be communicatively coupled to the data collection system 406 through the communication network 404. Thus, the data collection system 406 may receive multiple copies of the first data, the second data, the third data and the fourth data. The copies may be of the same degree (e.g., the television receivers 402A and 402C may each transmit the second data to the data collection), or of different degrees (e.g., the television receivers 402A and 402C may each transmit the first data to the data collection system 406). Thus, the data collection system 406 may apply various rules to determine which copy of the duplicate data to utilize for processing purposes.

In at least one embodiment, the data collection system 406 selects the copy of the data having the lowest degree. For example, the first data received from the television receiver 402A is more likely accurate than the first data received from the television receiver 402C. In other embodiments, the data collection system 406 compares each copy of the data to identify anomalies or other indications of tampering. For example, the first data received from the television receiver 402A may indicate that no pay-per-view movies have been ordered through the television receiver 402A, whereas the first data received from the television receiver 402C may indicate that a user of the television receiver 402A has ordered multiple pay-per-view movies. Thus, it is likely that a user has tampered with the first data received from the television receiver 402A, and the data collection system 406 may select to process the higher degree first data instead of the lowest degree copy of the first data.

Figure 5:
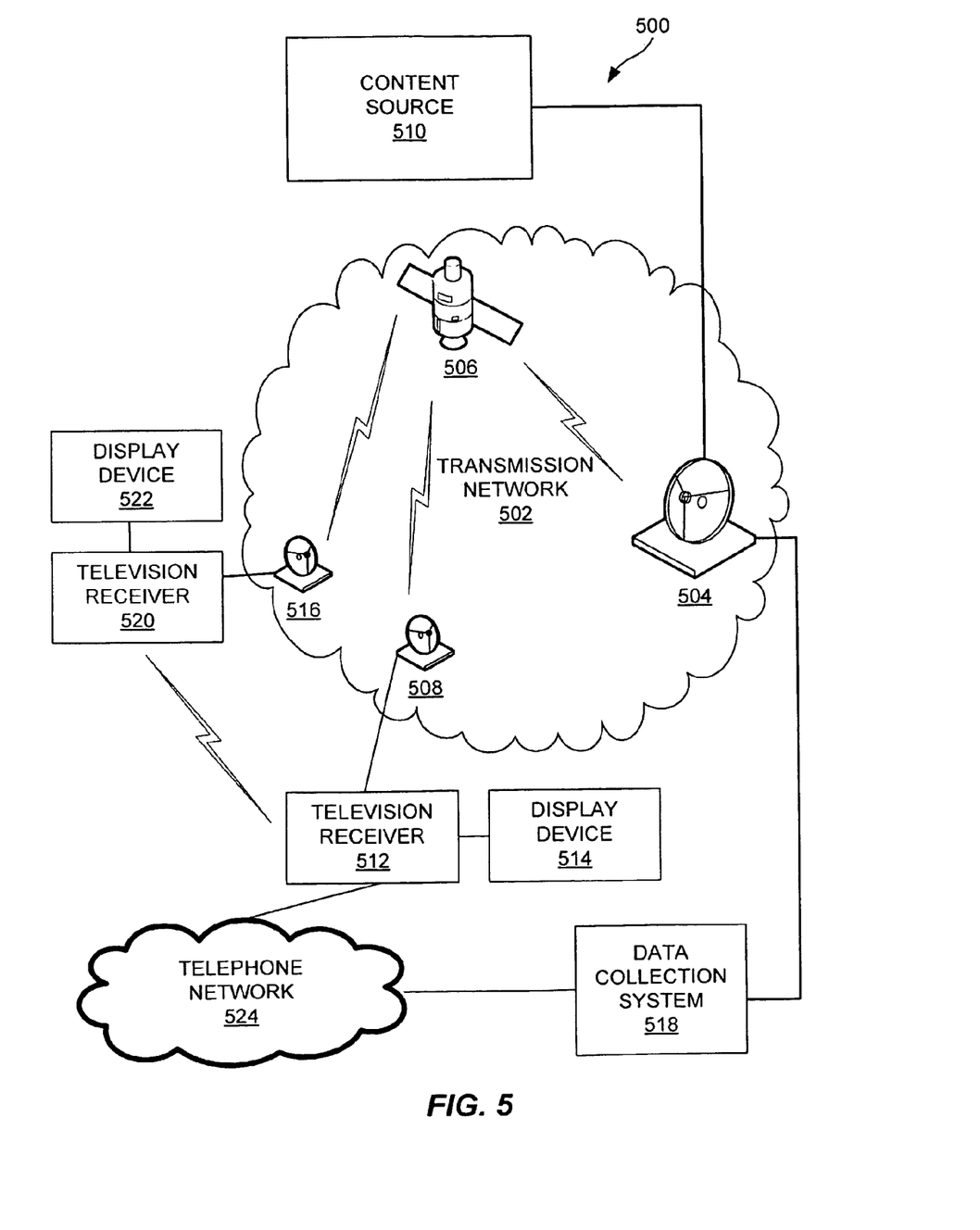
FIG. 5 illustrates an embodiment of a satellite broadcast system.

FIG. 5 illustrates an embodiment of a satellite broadcast system 500. The satellite broadcast system 500 includes a transmission network 502, an uplink system 504, a satellite 506, a first satellite antenna 508, a content source 510, a first television receiver 512, a first display device 514, a second satellite antenna 516, a data collection system 518, a second television receiver 520, a second display device 522 a telephone network 524. Each of these components will be discussed in greater detail below. Discussion of components common to FIGS. 1-4 is omitted for the sake of brevity.

Satellite broadcast system 500 includes a content source 510 in signal communication with an uplink system 504 of a transmission network 502. The content source 510 provides the uplink system 504 with television programs that are transmitted to a first television receiver 512. Television programs may be broadcast by the transmission network 502 to the first television receiver 512. A television program may be embodied as MPEG-2, MPEG-4 or other digital video signals, analog or baseband signals, and/or other video data on a channel of the satellite broadcast system 500.

Satellite broadcast system 500 further comprises a satellite 506 in signal communication with the uplink system 504. The satellite 506 broadcasts television programs received from the uplink system 504. The satellite broadcast system 500 further comprises first and second satellite antennas 508 and 516 that receive the television program broadcast from the satellite 506. The first satellite antenna 508 is in signal communication with the first television receiver 512, and provides the first television receiver 512 with a television program. A broadcast television program is received by the first television receiver 512 and outputted for presentation on the first display device 514. Similarly, the second satellite antenna 516 is in signal communication with the second television receiver 520, and provides the second television receiver 520 with a television program. A broadcast television program is received by the second television receiver 520 and outputted for presentation on the second display device 522.

As described above, the first and second television receivers 512 and 520 exchange information, and the television receiver 512 transmits the information to the data collection system 518 through the telephone network 524. The data collection system 518 analyzes the received data to determine information regarding the first and second television receivers 512 and 520. For example, the data collection system 518 may identify that the television receiver 520 is operating in an unauthorized location. The data collection system 518 generates a disablement message for transmission to the second television receiver 520 through the transmission network 502. The second television receiver 520 receives the disablement message and responsively disables the output of the video content. Thus, a user is no longer able to utilize the second television receiver 520 in the unauthorized location.

Figure 6:
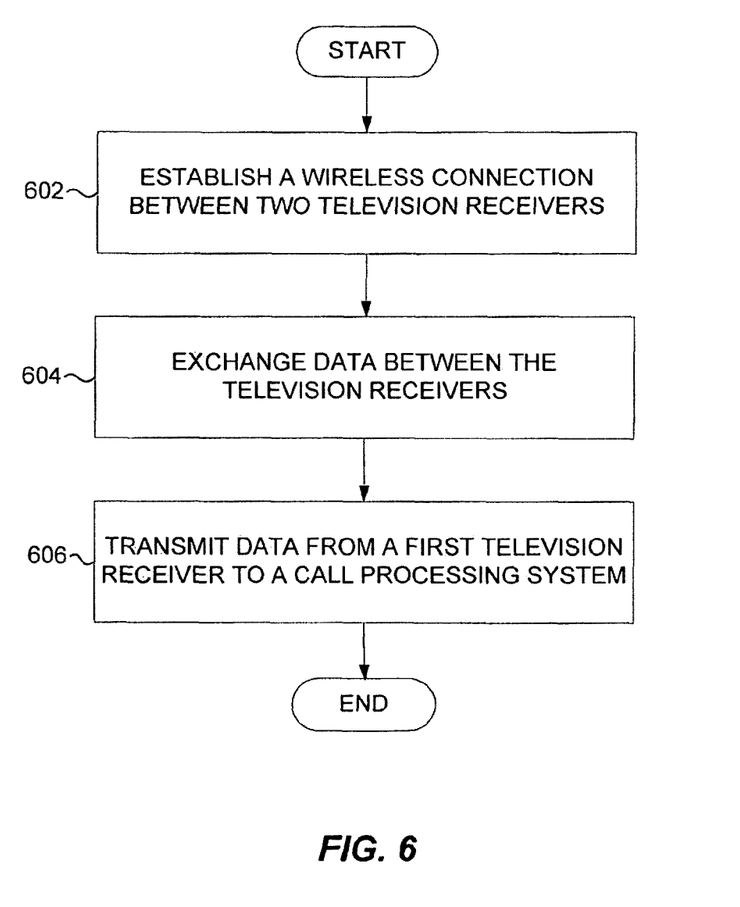
FIG. 6 illustrates an embodiment of a process for communicating information between multiple television receivers.

FIG. 6 illustrates an embodiment of a process for communicating information between multiple television receivers. More particularly, the process of FIG. 6 allows a television receiver to communicate data to a data collection system indirectly through another television receiver within wireless range. The process of FIG. 6 may include other operations not illustrated for the sake of brevity.

The process includes establishing a wireless connection between a first television receiver and a second television receiver (operation 602). In at least one embodiment, the wireless connection is established responsive to discovery requests by the first or second television receivers. In other embodiments, the television receivers may have previously communicated, and the wireless connection may be established responsive to a pre-determined schedule or other event.

The process further includes exchanging data between the first television receiver and the second television receiver (operation 604). The first television receiver may transmit first data to the second television receiver. Similarly, the second television receiver may transmit second data to the first television receiver. In some embodiments, the data exchanged may include information regarding a third television receiver not involved in the data exchange.

The process further includes transmitting at least some of the data from the first television receiver to a data collection system (operation 606). The data collection system utilizes the data to determine information regarding the second television receiver. In effect, the first television receiver acts as a communication node between the second television receiver and the data collection system. The data collection system may then perform various analyzation functions, such as generating bills, identifying piracy/fraud, identifying programming authorized at the location of the second television receiver, identifying operating problems of the second television receiver and the like.

Although specific embodiments were described herein, the scope of the invention is not limited to those specific embodiments. The scope of the invention is defined by the following claims and any equivalents therein.

I claim:

1. A satellite television receiver comprising:
a set-top box located externally to a display device, wherein the set-top box is configured to receive and demodulate satellite television signals and to output the satellite television signals on the display device, the set-top box comprising:
an input module that receives first audio-video content from an external broadcast content source, the input module comprising a tuner operable to receive and tune a satellite television signal;
a processor communicatively coupled to the input module that outputs the first audio-video content for presentation on a presentation device;
a wireless interface module communicatively coupled to the processor that:
utilizes a first satellite antenna to transmit and receive data with a second satellite television receiver, wherein the first satellite antenna includes a first integrated wireless antenna that is operable to communicate with a plurality of satellite television receivers within a first wireless range;
discovers the second satellite television receiver within the first wireless range, utilizing the first integrated wireless antenna,
wherein the second satellite television receiver comprises a second set-top box located externally to a second display device, wherein the second satellite television receiver includes a second tuner operable to receive and tune a satellite television signal, wherein the second satellite television receiver utilizes a second satellite antenna to transmit and receive data with the satellite television receiver and a third satellite television receiver, wherein the second satellite antenna includes a second integrated wireless antenna that is operable to communicate with a plurality of satellite television receivers within a second wireless range;
wherein the second satellite television receiver is in a location that is disparate with respect to the satellite television receiver and the third satellite television receiver, and communicates independently with the external broadcast content source to receive second audio-video content,
wherein the second satellite television receiver is within wireless range of the third satellite television receiver,
wherein the third satellite television receiver comprises a third set-top box located externally to a third display device, wherein the third satellite television receiver includes a third tuner operable to receive and tune a satellite television signal, wherein the third satellite television receiver utilizes a third satellite antenna to transmit and receive data with the second satellite television receiver, wherein the third satellite antenna includes a third integrated wireless antenna that is operable to communicate with a plurality of satellite television receivers within a third wireless range;
wherein the satellite television receiver is out of the third wireless range;
establishes a wireless connection with the second satellite television receiver;
receives first data and second data from the second satellite television receiver, the first data including information regarding the usage of the second satellite television receiver, and the second data including information regarding the usage of the third satellite television receiver; and
a network interface module that transmits the first data and the second data to a data collection system through a communication network, wherein the data collection system is:
remotely located relative to the satellite television receiver, the second satellite television receiver, and the third satellite television receiver; and
operable to analyze the first data and the second data to identify unauthorized usage;
wherein the second satellite television receiver has no direct connectivity to the communication network; and
wherein the third satellite television receiver has no direct connectivity to the communication network.

2. The satellite television receiver of claim 1, wherein the data collection system comprises a call processing system, and wherein the network interface module comprises a modem that transmits the first data to the call processing system over a telephone network.

3. The satellite television receiver of claim 1, wherein the network interface module comprises a broadband connection that transmits the first data to the data collection system over an internet connection.

4. The satellite television receiver of claim 1, wherein the processor detects that the wireless interface module has been disabled and responsively disables the output of the video content.

5. A communication network comprising:
a data collection system;
a first satellite television receiver in direct communication with the data collection system via a communication network, the first satellite television receiver comprising a set-top box located externally to a display device, wherein the set-top box is configured to receive and demodulate satellite television signals and to output the satellite television signals on the display device, the set-top box comprising:
- a first processor that generates first data regarding output of audio-video content and operating conditions of the first satellite television receiver,
- an input module comprising a tuner operable to receive and tune satellite television signals;
- wherein the first television receiver is configured to utilize a first satellite antenna to discover, transmit and receive data with a first plurality of satellite television receivers within a first wireless communication range of the first satellite television receiver, wherein the first satellite antenna includes a first integrated wireless antenna that is operable to communicate with the first plurality of satellite television receivers within the first wireless communication range;

a second satellite television receiver within the first wireless communication range of the first satellite television receiver, the second satellite television receiver having no direct connectivity to the communication network and having no direct connectivity to the data collection system, the second satellite television receiver comprising a second set-top box located externally to a second display device, wherein the second set-top box is configured to receive and demodulate satellite television signals and to output the satellite television signals on the second display device, the second set-top box comprising:
- a second processor that generates second data regarding output of audio-video content and operating conditions of the second satellite television receiver,
- a second input module comprising a second tuner operable to receive and tune satellite television signals;
- wherein the second television receiver is configured to utilize a second satellite antenna to discover, transmit and receive data with a second plurality of satellite television receivers within a second wireless communication range of the second satellite television receiver, wherein the second satellite antenna includes a second integrated wireless antenna that is operable to communicate with the second plurality of satellite television receivers within the second wireless communication range;

a third satellite television receiver within wireless communication range of the second satellite television receiver and out of wireless communication range of the first satellite television receiver, the third satellite television receiver having no direct connectivity to the communication network and having no direct connectivity to the data collection system, the third satellite television receiver comprising a third set-top box located externally to a third display device, wherein the third set-top box is configured to receive and demodulate satellite television signals and to output the satellite television signals on the third display device, the third set-top box comprising:
- a third processor that generates third data regarding output of audio-video content and operating conditions of the third satellite television receiver,
- a third input module comprising a third tuner operable to receive and tune satellite television signals;
- wherein the third satellite television receiver is configured to utilize a third satellite antenna to discover, transmit and receive data with a third plurality of satellite television receivers within a third wireless communication range of the third satellite television receiver, wherein the third satellite antenna includes a third integrated wireless antenna that is operable to communicate with the third plurality of satellite television receivers within the third wireless communication range;

wherein:
- the second satellite television receiver is operable to wirelessly receive the third data from the third satellite television receiver, and to aggregate the third data with the second data, resulting in first aggregated data;
- the first satellite television receiver is operable to wirelessly receive the first aggregated data from the second satellite television receiver, and to aggregate the first data with the first aggregated data, resulting in second aggregated data; and
- the first satellite television receiver is operable to transmit the second aggregated data to the data collection system through the communication network;
- the data collection system is operable to analyze the second aggregated data, once received, to identify unauthorized usage by the first satellite television receiver, the second satellite television receiver, or the third satellite television receiver; and
- when unauthorized usage has been identified, the data collection system is further operable to disable audio-video output.

6. The communication network of claim 5, wherein the data collection system processes the second aggregated data to identify programming that the first satellite television receiver is authorized to output for presentation.

7. The communication network of claim 5, wherein the data collection system processes the second aggregated data to identify operating problems of the first satellite television receiver.

8. The communication network of claim 5, wherein the data collection system is further configured to:
- analyze the first aggregated data and the second aggregated data to identify duplicate data, wherein a plurality of duplicate data is associated with an individual satellite television receiver;
- compare each of the identified duplicate data to identify indications of tampering with the individual satellite television receiver; and
- when indications of tampering have been identified, disabling audio-video output for the individual satellite television receiver.

9. The communication network of claim 8, wherein the data collection system is further configured to:
- compare each of the identified duplicate data to identify data anomalies associated with the individual satellite television receiver; and
- when data anomalies have been identified, disabling audio-video output for the individual satellite television receiver.

10. The communication network of claim 5, wherein the data collection system is further configured to:
- analyze the first aggregated data and the second aggregated data to identify a plurality of locations, each of the plurality of locations associated with an individual one of the first plurality of satellite television receivers, the second plurality of satellite television receivers, or the third plurality of satellite television receivers;
- identify whether each of the plurality of locations comprises an authorized location; and
- when an individual one of the plurality of locations does not comprise an authorized location, disabling audio-video content for an associated individual one of the first plurality of satellite television receivers, the second plurality of satellite television receivers, or the third plurality of satellite television receivers.

11. The communication network of claim 5, wherein the data collection system is further configured to:
analyze the first aggregated data and the second aggregated data to identify a subset of the first plurality of satellite television receivers, the second plurality of satellite television receivers, or the third plurality of satellite television receivers for which access to the communication network has been disabled; and
disable audio-video output for the subset of the first plurality of satellite television receivers, the second plurality of satellite television receivers, or the third plurality of satellite television receivers.

12. The communication network of claim 5, wherein the data collection system is further configured to:
receive the first aggregated data and the second aggregated data via a broadband internet connection.

13. The communication network of claim 5, wherein the data collection system is further comprising configured to:
receive the first aggregated data and the second aggregated data via a telephone communication system.

14. The satellite television receiver of claim 1, wherein the data collection system is further operable to analyze the first data and the second data to identify Pay Per View (PPV) ordering information.

15. The satellite television receiver of claim 1, wherein the data collection system is further operable to analyze the first data and the second data to identify demographic information.

16. The satellite television receiver of claim 1, wherein the data collection system is further operable to analyze the first data and the second data to identify health and diagnostic information.

* * * * *